July 25, 1967  J. P. BEZERIE  3,332,641
REMOTE CONTROL SYSTEM FOR A ROTATING MISSILE
Filed Feb. 26, 1964  4 Sheets-Sheet 1
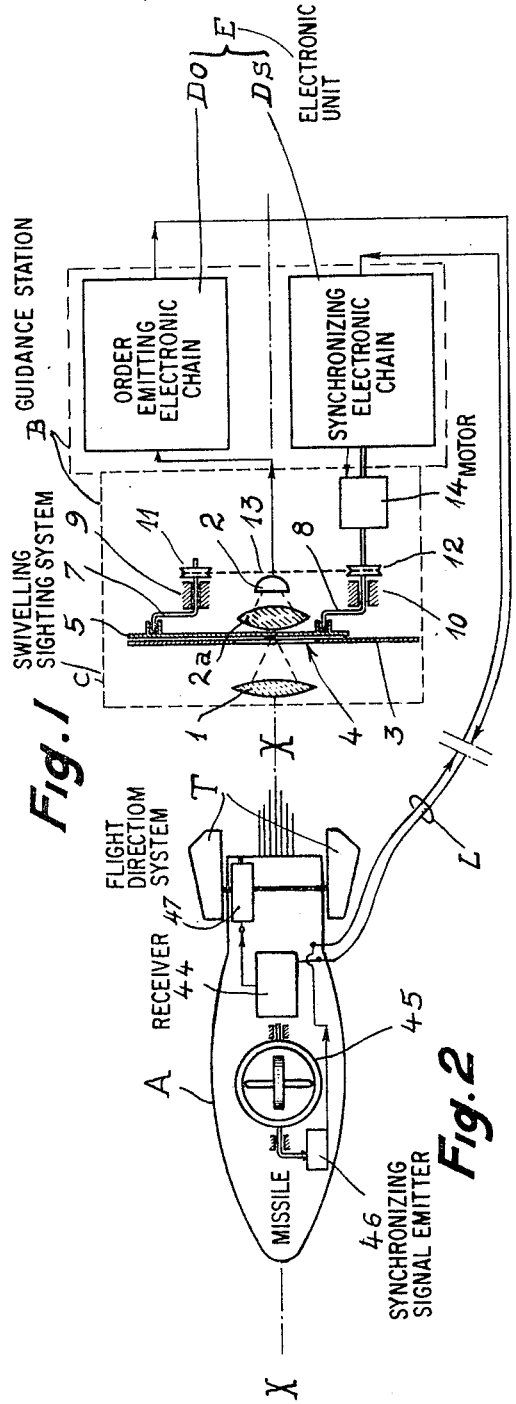
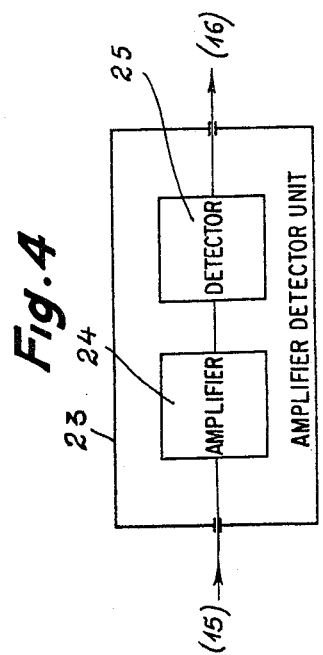
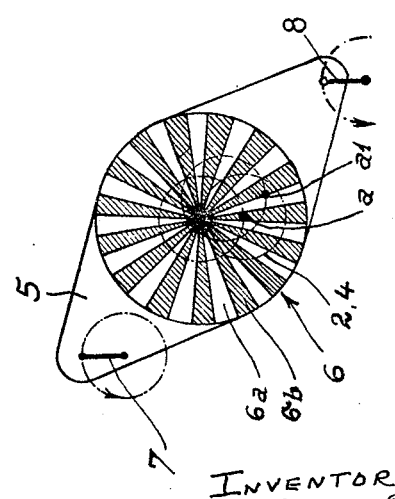
INVENTOR
JEAN PIERRE BEZERIE
By *A. S. Leek*
ATTORNEY July 25, 1967   J. P. BEZERIE   3,332,641
REMOTE CONTROL SYSTEM FOR A ROTATING MISSILE
Filed Feb. 26, 1964   4 Sheets-Sheet 2

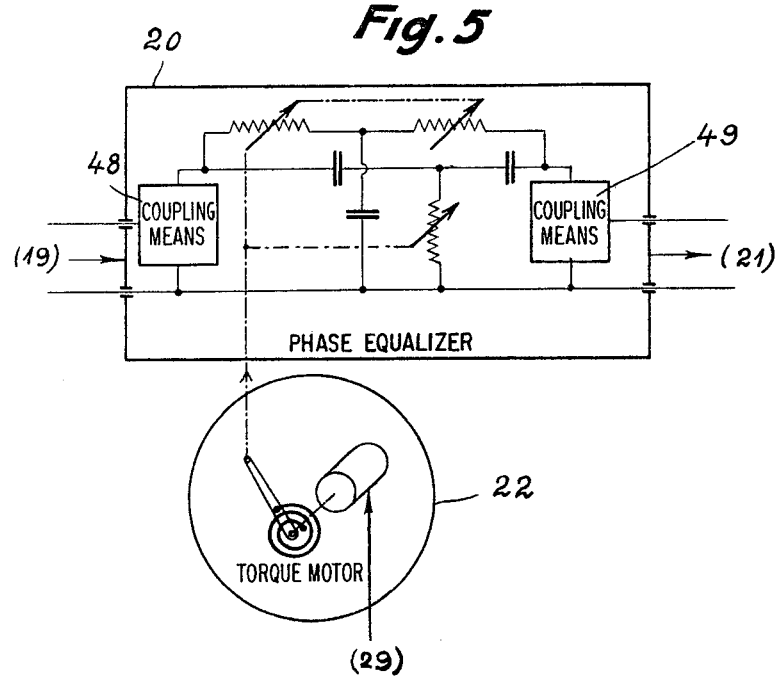
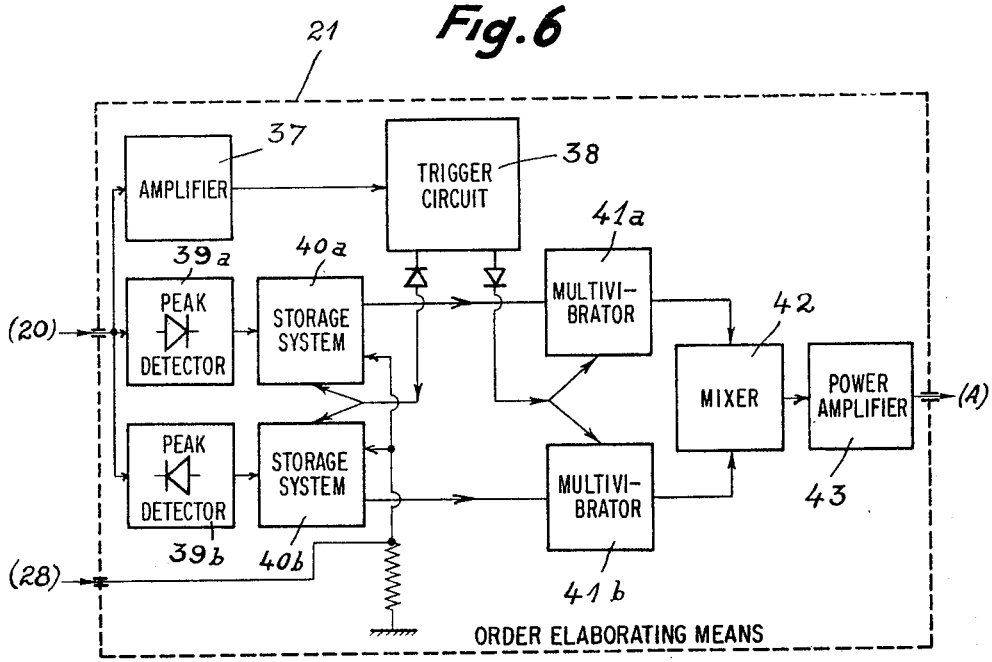

United States Patent Office 3,332,641
Patented July 25, 1967

3,332,641
REMOTE CONTROL SYSTEM FOR A ROTATING MISSILE
Jean Pierre Bèzerie, Ville-d'Avray, France, assignor to Societe Anonyme de Telecommunications, Paris, France, a French company
Filed Feb. 26, 1964, Ser. No. 347,594
Claims priority, application France, Feb. 27, 1963, 926,229, Patent 1,391,681
2 Claims. (Cl. 244—3.12)

The present invention relates to the remote-control of autorotative missiles, that is to say missiles which rotate about their rolling axis or longitudinal axis, said remote-control system being designed for controlling direction-control systems to be actuated in cyclic operation, that is to say every time that, in the course of its movement of rotation about its axis, the missile is located in a position which is defined angularly relative to a reference direction containing a reference plane which is fixed in space and which contains the axis of autorotation of the missile.

For the remote control or "command guidance" of an autorotative missile, as known in other respects, the result to be obtained is to initiate on the missile the appearance of a force vector having suitable amplitude and direction which causes the missile to follow and to be maintained on a predetermined optical axis, this being achieved by transmitting from a remote-control station orders which are elaborated as a function of the difference existing at a given moment between the real position of the missile as compared with the position which this latter should normally occupy in order to travel effectively along the axis referred to above.

The desired result is obtained by virtue of the method which consists in detecting optically and electronically the position, in polar coordinates, of the missile relatively to a reference optical axis, in synchronizing this detection with the rotation of the missile, by the action of synchronizing signals which are emitted cyclically by the missile, by a method well known in other respects, and which define the instantaneous angular position of the missile with respect to a reference position about its autorotational axis, in making use of the aforesaid detection for the purpose of generating order-emitting signals which, according to a method well known in other respects, are transmitted in synchronism with and cyclically to a receiving apparatus located on board said missile and which directs the motion of the missile for the purpose of returning said missile onto the optical axis hereinabove referred to.

For the practical operation of the above-mentioned method, there is provided, according to the invention, a device which especially consists of a control, or command, station proper comprises, in combination, optical-electronic means for the cyclic detection of the position (in polar coordinates) of a missile, said means being of the type wherein any deviation of said missile relatively to a reference axis (which is preferably the optical axis of the optical-electronic means) produces, in order to develop, in a cyclic sequence, signals which indicate the deviation of the missile, a periodic variation about a constant mean value in the frequency of signals, thereafter called "pilot signals" which are generated by said optical-electronic means, an order-emitting electronic chain (for converting the aforesaid deviation-indicating signals into orders) which is connected to the aforesaid optical-electronic means and, according to a method well known in other respects, the control signals of which are to be transmitted cyclically to the autorotative missile which is fitted with a receiver and a flight direction system as well as a synchronizing electronic chain which receives from the missile synchronizing signals generated by the cyclic movement of said missile through a reference position about its axis of rotation, said synchronizing chain being designed to produce action, on the one hand, on the optical-electronic detector means in order to maintain constant the ratio of the mean frequency of the pilot signals to the autorotational velocity of the missile and, on the other hand, on the order-emitting electronic chain for the purpose of synchronizing the transmission of motion-control orders to the missile with a predetermined angular position of said missile about the axis of rotation thereof.

In a preferred form of embodiment of the device for the remote control of autorotative missiles, said device is further remarkable by the following features and combinations thereof:

The means for detecting the position of the missile relatively to a reference axis are of the known type comprising, placed behind an object-lens of which the optical axis preferably constitutes the aforesaid reference axis, a light modulator constituted by a plane support which is disposed in the image plane of the object-lens and carries an occulting grating made up of radial sectors which are alternately transparent and opaque and driven by motor means for executing, while remaining parallel to itself, a circular motion such that the center of said grating describes a circumference which substantially coincides with the edge of a circular window formed in a diaphragm which is placed immediately in front (or behind) the modulator, a stationary photoelectric cell located to the rear of said modulator with optional interposition of an optical condenser and designed to produce pilot signals having a frequency which constitutes the criterion of the position of the missile; the said photoelectric cell is connected to the input of an order-emitting electronic chain of an electronic unit which also comprises the synchronizing electronic chain for controlling the phase of the order-emitting means and the motor means for driving the modulator so as to ensure that the velocity of circular translational motion of said modulator is at each moment strictly equal to the velocity of autorotation of the missile.

The order-emitting electronic chain comprises, disposed in sequential relation, at least one amplifier for the amplification of pilot signals derived from the photoelectric cell, an amplitude limiter, a frequency discriminator, a retunable phase correction controlled by the synchronizing electronic chain and means for elaborating motion-control orders.

The frequency discriminator can be followed by an amplifier.

The pilot signal amplifier can be preceded by a preamplifier.

The phase corrector is actuated by motor means, for example a torque motor, which are controlled by the synchronizing chain.

In the case in which the missile to be remote-controlled emits, for transmission to the optical-electronic detector means, signals modulated at a frequency which is higher than the frequency produced by the modulator, a unit comprising a detector and an amplifier (which latter is responsive to the frequency of said modulated signals) is interposed between the preamplifier and the pilot signal amplifier.

Depending on the nature of the order-receiving means of the missile, the order-elaborating means can be so designed as to form either continuous cyclic-variation control signals or, as well known in other respects, noncontinuous cyclic control signals.

When the missile is fitted with control units (to be operated from a distance at the command station) which are designed to ensure a linear relation between a control voltage which is applied thereto and the force which is supplied by said control units, the order-elaborating means consist of a power amplifier.

When, according to a method well known in other respects, the control units on board the missile are not designed to ensure a linear relation between a control voltage which is applied thereto and the force which is supplied by the said control units, the order-elaborating means are adapted to produce, at each revolution of the missile, a square-wave signal which is developed at the time of maximum value of the alternating-current voltage delivered by the frequency discriminator.

The order-elaborating means which produce the square-wave signals comprise, connected in parallel to the output of the phase corrector, two peak detectors which are mounted in opposition and a trigger circuit (for example a Schmidt trigger) which is advantageously preceded by an amplifier, each peak detector being connected to a storage system which is coupled to a flip-flop generator or monostable multivibrator which is both timed and operated in dependence on reference frequency which is function of the speed of the motor controlling the modulator of the optical-electronic detector, the two monostable multivibrators being connected to a mixer followed by a power amplifier, one of the outputs of the trigger circuit being coupled in parallel to the two storage systems while the other output of the trigger circuit is coupled in parallel to the two monostable multivibrators.

The synchronizing electronic chain comprises two signal generators which are actuated by the motor means of the optical-electronic detector, one of said generators being designed to produce signals having a frequency which corresponds to the speed of rotation of said motor means and being connected (preferably through the intermediary of an amplifier) to two electronic trigger circuits which are also controlled, preferably through the intermediary of an amplifier, from the synchronizing signals derived from the missile, the outputs of the two aforesaid trigger circuits being connected to a mixer which is coupled to a power amplifier for supplying the aforesaid motor means, said power amplifier being in addition advantageously controlled in dependence on a programming device, while the second generator produces signals having a frequency which are a multiple of the frequency of the signals produced by the first generator, said second generator being connected to a frequency discriminator which, through the intermediary of a direct-current amplifier, controls the torque motor of the phase equalizer.

The means for detecting the angular position of the missile about its axis of autorotation consist, for example, of a rolling-motion gyroscope which controls, in a predetermined angular position of the missile about its axis of autorotation, means for emitting synchronizing signals.

The characteristic features of the invention will be brought out by the description which follows below, reference being made to one example of embodiment of the new remote-command guidance device of an auto-rotative missile, known in other respects, said example being given and illustrated diagrammatically in the accompanying drawings, in which:

FIG. 1 is a diagram showing the combined assembly of the remote-command guidance device comprising the station which emits orders for the control of movement and the auto-rotative missile, known in other respects, which is controlled from this station;

FIG. 2 is a front view of the modulator of the command station which emits orders for the control of movement;

FIG. 3 is a diagram of the electronic assembly which is formed of the order-emitting electronic chain and of the synchronizing electronic chain;

FIG. 4 is a diagram of elements to be inserted in the order-emitting electronic chain in the case of emission by the missile of signals which are modulated at a higher frequency than that of the pilot signals generated by the modulator;

FIG. 6 is a diagram of an order-elaborating device of the order-emitting electronic chain in the case of square-wave orders, which are required by a missile known in other respects;

Figure 7:
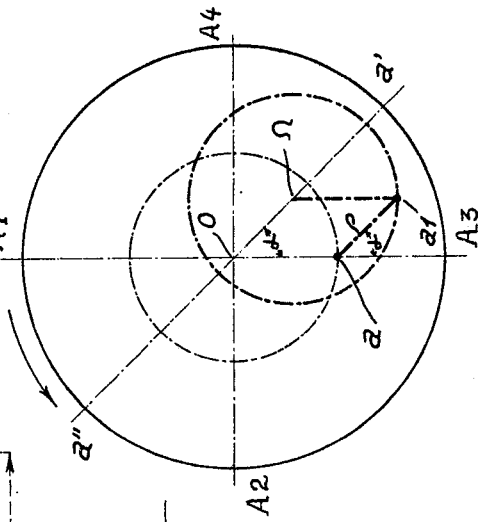
FIG. 7 represents in a simplified manner and on a larger scale the modulator of FIG. 2, and brings out the processes which take place when the missile deviates from the reference axis or a direction in which it is intended to be headed towards a predetermined target.

Before entering into the main part of this specification, it should be pointed out finally that those elements which are not described in detail are well known to those skilled in the art and secondly that, for the sake of clarity of the drawings, all electrical leads have been shown as single wires.

In FIG. 1, the missile to be guided by remote command has been designated by the reference A while a remote-command guidance station has been designated by the reference B and comprises a swivelling optical-electronic sighting system C, the axis X—X of which constitutes the reference axis.

The sighting system is of a known type and comprises an object-lens 1 which projects the image (as infrared radiation, for example) from the missile A which is assumed to be heading for a target on which is orientated the optical axis of the said object-lens.

A diaphragm 3 which is provided with a circular window 4 defines the useful limits of the field of the object-lens 1.

On the downstream side of the diaphragm 3, there is located in the image plane of the object-lens 1 a movable flat support 5 carrying an occulting grating formed of sectors which are alternately transparent and opaque such as the transparent sector 6a and opaque sector 6b (see FIG. 2), the combined assembly of which forms the modulator 6 proper, to the rear of which is located a condenser 2a which concentrates on a photoelectric cell 2 the light of the image which is formed on the modulator 6. (It will be noted that the diaphragm 3 could also be placed on the downstream side of the modulator support 5.)

The modulator support 5 is mounted on the crank-pins of two cranks 7, 8 which are rotatably mounted respectively at 9 and 10 and on the shafts of which are keyed identical pulleys 11 and 12 respectively which are coupled together by a transmission belt 13, the crank 8 being additionally driven by an electric motor 14. The radius of the cranks 7 and 8 is substantially equal to the radius of the circular window 4 and the modulator 6 is mounted in such a manner that its center (namely the point of convergence of the sectors 6a, 6b), is located substantially on the edge of said window.

It will be apparent that when the motor 14 rotates, the modulator 6 performs in its own plane (while remaining parallel to itself) a circular movement whilst the centre of said modulator follows a path which coincides with the edge of the window 4.

The swivelling unit C is integral with a auxiliary sighting device (not shown in the drawings) which is so designed that it can be directed towards the target (and also follow a moving target) which is to be reached by the missile A, in such a manner that the center of the window 4 is located substantially on the sighting line X—X which extends from the target (not shown) to the object-lens 1.

If the missile A is located on said sighting line, its image will appear at the center of the window 4, thereby indicating that the missile is correctly headed on course in the direction of the target. If the missile A deviates from the sighting line X—X while nevertheless remaining within the field of view of the unit C, its image no longer appears at the center of said window; the effect of the command guidance control is to bring the missile back onto the sighting line referred-to, which of course results in the return of the image of the missile A towards the center of the window.

A description now follows in reference to the electronic system E which is associated with the system B and which is connected to the autorotative missile A.

As appears from FIG. 1, the electronic system E comprises an order-emitting electronic chain DO and a synchronizing electronic chain DS.

The order-emitting chain DO comprises (as shown in FIG. 3), connected to the photoelectric cell 2, a preamplifier 15, the output of which is connected to a bandpass amplifier 16 corresponding to the frequency spectrum of the pilot signals which can be supplied by the photoelectric cell 2, under conditions which will be explained in detail hereinafter. The output of the amplifier 16 is connected to the input of an amplitude limiter or peak-flattening device 17, the output of which is connected to a frequency discriminator 18. This latter is connected through the intermediary of an amplifier 19 and a carrier-wave phase equalizer 20 to order-elaborating means 21, the signals of which are intended to be transmitted to the missile A. The carrier-wave phase equalizer 20 is regulated as a function of the angular velocity of the missile A about the autorotational axis thereby by means of a torque motor 22 which is controlled by the synchronization chain DS.

In order to prevent the effects of jamming or to improve the signal-to-noise ratio, it may prove useful to design the missile A in such a manner as to cause this latter to emit for the purpose of transmission to the optical-electronic system, not a continuous signal, but signals which are modulated at a frequency which is higher than the frequency of the pilot signals generated by the modulator 6. In this case, the order-emitting electronic chain DO is completed at point IV by an amplifier detector unit 23 consisting of an amplifier 24 and a detector 25 (as shown in FIG. 4), at the outlet of which the pilot signals will again appear at the same frequency as that which results from the modulation produced by the modulator 6.

The synchronization chain shown in FIG. 3 comprises, actuated by the motor 14, on the one hand, a signal generator 26 (for example for generating synchronizing signals) having a reference frequency which will be designated hereinafter as the "driving frequency" and, on the other hand, a signal generator 27 having a frequency which is a multiple of the frequency of the signals produced by the generator 26.

The signal generator 27 is connected to a frequency discriminator 28 which, through the intermediary of an amplifier 29, controls the torque motor 22.

The "driving frequency" generator 26 is connected, through the intermediary of an amplifier 31, to one of the two inputs of each of the two trigger circuits 32a and 32b while the other input receives, through the intermediary of an amplifier 33, the synchronizing signals which are emitted by the missile A.

The outputs of the trigger circuits 32a and 32b are connected to a mixer 34, the output of which is connected through the intermediary of a power amplifier 35 to the motor 14.

In view of the fact that, at the starting of the missile, the auotorotational velocity of the missile varies between fairly wide limits before attaining a value which corresponds to stable flight conditions and which subsequently decreases only to a very slight extent, it is advisable to control the power amplifier 35 at least temporarily in dependence on a programming device 36 which effectively controls the speed of rotation of the motor 14 so that this latter is capable of following the variations in autorotational velocity of the missile, the synchronizing electronic chain then coming into action so as to perfect the synchronization.

In the case in which the missile A comprises control units which are designed to ensure a linear relation between a control voltage and the corresponding force which said units can exert on the means to be controlled (for example, a flight-directional system) the order-elaborating means 21 can consist of a single power amplifier.

In the contrary event, well known in other respects, wherein the control units are not able to ensure a linear relation between the control voltage and the corresponding force, the orders are transmitted in the form of square-wave signals for the elaboration of which the order-emitting means are then arranged in the manner which is shown in FIG. 6.

In this particular case, the order-emitting means 21 comprise, connected in parallel from the phase equalizer 20, an amplifier 37 which controls a trigger circuit 38 (Schmidt trigger) and two peak detectors 39a and 39b which act in opposite directions.

The peak detectors 39a and 39b are connected respectively to two storage systems 40a and 40b which receive a voltage supplied by the frequency discriminator 28 (as shown in FIG. 3) and which are controlled in parallel from one output of the trigger circuit 38, the other output of which is connected in parallel with two flip-flop generators or monostable multivibrators 41a and 41b which are respectively controlled in dependence on the storage systems 40a and 40b, the outputs of the two monostable multivibrators mentioned above terminating on a mixer 42, the movement-control square-wave signals of which are amplified by a power amplifier 43 prior to being transmitted to the missile A.

It is assumed that, according to an arrangement well known in other respects, in the missile A, provision is made for a receiver 44 to which are transmitted the movement-control orders derived from the element 21 of the order-emitting chain DO and that said receiver 44 produces, for example cyclically, as well known in other respects, that is to say at each revolution of the missile, the short-time operation, according to a method well known in other respects, of a device such as a flight-direction system 47 controlling rudders T, also well known.

It is further assumed that a rolling-motion gyroscope 45 is mounted on board the missile and controls a synchronizing-signal emitter 46 every time that, in the course of its rotational motion, the missile A moves from a given angular position about its autorotational axis, the said synchronizing signals being transmitted to the synchronizing electronic chain DS of the electronic unit E.

In the accompanying drawings, it has been assumed, for the sake of clarity of the description, that the electronic unit E of the command station is connected to the missile A by means of aerial leads L, according to a method well known in other respects. It will be readily apparent, however, that any known method of transmission or communication can be employed such as, for example, radio waves, ultrasonics, optical signals (visible signals, ultraviolet or infrared signals), etc.

The mode of operation of the device will now be described.

As can be visualized especially from FIG. 2, when the motor 14 drives the cranks 7 and 8, the modulator 6 carries out (while remaining parallel to itself in its own plane) a movement of translation along a circumference having a radius which corresponds to that of the cranks.

The modulator 6 proper has a radius which is at least equal to double that of the aforesaid circumference.

If the spot image $a$ of the missile A is projected in the axis of the window 4 and the motor 14 rotates at a speed which is assumed to be constant, the image $a$ is occulted at regular intervals by the opaque sectors $6b$ of the modulator 6, just as if this same image moved on said modulator as assumed to be stationary along a circumference passing through $a$, with the result that the current derived from the photoelectric cell 2 will have an alternating-current component which constitutes the pilot signals, the frequency of which will be stationary and equal to the product of the number of opaque sectors and of the number of revolutions per second performed by the cranks.

On the other hand, if the image of the missile A is located at $a^1$ (the missile having deviated from the line X—X), it is an eccentric circumference passing through $a^1$ which must be considered and this deviation of the image results in a periodic variation about a constant mean value of the frequency of the pilot signals derived from the photoelectric cell 2, and the period of this variation corresponds to one revolution of the cranks 7 and 8.

For the sake of clarity of the description which now follows, it will be assumed that the modulator 6 is motionless and that (by means of any suitable expedient) the image $a$ of the missile is caused to perform a circular movement. Consideration will also be given to FIG. 7 which represents on a larger scale and in a simplified manner, on the one hand, the modulator 6 as shown only at the periphery thereof and, on the other hand, four reference positions $OA_1$, $OA_2$, $OA_3$ and $OA_4$ of a vector (OA) which passes through the moving image $a$.

When the missile A is on the sighting line X—X, its image $a$ follows a circumference having a center O. On the other hand, when said missile has deviated from said sighting line, its image $a'$ follows a circumference having a center $\Omega$, this circumference being displaced off-center relatively to O but has the same radius as the circumference which is followed by the centered image $a$.

The line of the centers $O\Omega$ is parallel to the line of the images $a$, $a^1$ and gives the positions (on a line $a'-a''$) of the vector (OA) at which the frequency of the pilot signals derived from the photoelectric cell 2 has respectively its minimum value and maximum value.

It will be noted:
On the one hand, that the difference between the two limit frequencies will be correspondingly greater as $\Omega$ is more distant from O (therefore the image $a^1$ will be more distant from the image $a$), that this difference between the two limit frequencies gives a measurement of the distance between the two images $a$ and $a'$, that is to say of the deviation of the missile (as represented by its image $a^1$) relatively to the stationary line X—X (image $a$), and On the other hand, that if provision is made for a means for indicating the moment at which the image occupies on the modulator 6 (which is still assumed to be stationary) the position which is defined by the vector $a^1$, the time interval which elapses between this moment and the moment at which the variable frequency of the pilot signals derived from the photoelectric cell reaches a limit value depends on the angle $$\widehat{A_3 O \Omega}$$

or on the angle $$\widehat{A_3 a a_1}.$$

In view of the fact that the field which is covered by the object-lens is small it can be admitted that, the frequency of the pilot signals derived from the photoelectric cell 2 varies sinusoidally about the fixed frequency which would be obtained if the image $a^1$ were to coincide with the image $a$ (this approximation being in any case wholly sufficient for practical purposes).

Under these conditions, it can be stated that the variable frequency $F_v$ is defined by the formula:

$$F_v = F_0 - K\rho \cos(\theta - \alpha)$$

wherein
$F_o$ is the fixed frequency produced by the image $a$;
K is a constant;
$\rho$ is the distance between $a$ and $a^1$;
$\theta$ is the angle through which the image has rotated starting from the reference vector $OA_1$ taken as origin;
$\alpha$ is the angle $$\widehat{A_3 a a_1}$$

made between the straight line $OA_3$ and $a\,a_1$.

It is thus apparent: That the variation of the frequency $F_v$ comply with the variation of the angle $\theta$; that the difference between the two limit values of $F_v$ is $2K\rho$; and lastly, that the appearance of the two limit values of $F_v$ is characterized by the values $\theta = \alpha$ and $\theta = \pi + \alpha$.

By virtue of the fact that a synchronizing signal which is emitted by the missile and applied through the intermediary of the synchronizing chain DS to the motor 14 achieves synchronism (while maintaining agreement of phases) between the rotational velocity of the modulator 6 and the autorotational velocity of the missile, it is possible to define simultaneously the origin of the angle $\theta$ and its variation in time.

The conditions of operation of the electronic unit E will now be examined.

The pilot signals which are derived from the photoelectric cell 2 reach the frequency discriminator 18 through the intermediary of the elements 15, 16 and 17 and said frequency discriminator delivers a sinusoidal voltage (curve $V_0$ in the diagram of FIG. 9) which is representative of the cyclic variation of the frequency of the pilot signals, the period of said variation coresponding to one revolution of the cranks 7 and 8, that is to say to one revolution of the missile A about its axis since it is assumed that the velocity of rotation of the missile is in synchronism with the velocity of rotation of the cranks. It will be apparent that this voltage has zero amplitude when the image of the missile A is correctly centered (no deviation between the missile and the reference line X—X) and that, under these conditions, the chain DO does not transmit any movement-control orders to the missile.

When the missile emits signals for the formation of its image in the optical detector and said signals are modulated (which is interposed at IV in FIG. 3) in order that the pilot signals, it will be merely necessary to carry out the detection of said signals by means of the device of FIG. 4 (which is interposed at IV in FIG. 3) in order that the pilot signals should again appear at the output of said device at their natural frequency.

The sinusoidal voltage $V_0$ is applied to the order-emitting means 21 through the intermediary of the phase equalizer 20, the function of which is to produce a phase lead for the purpose of compensating the time-lags of the looped circuit which is formed by the remote-control device.

Figure 5:
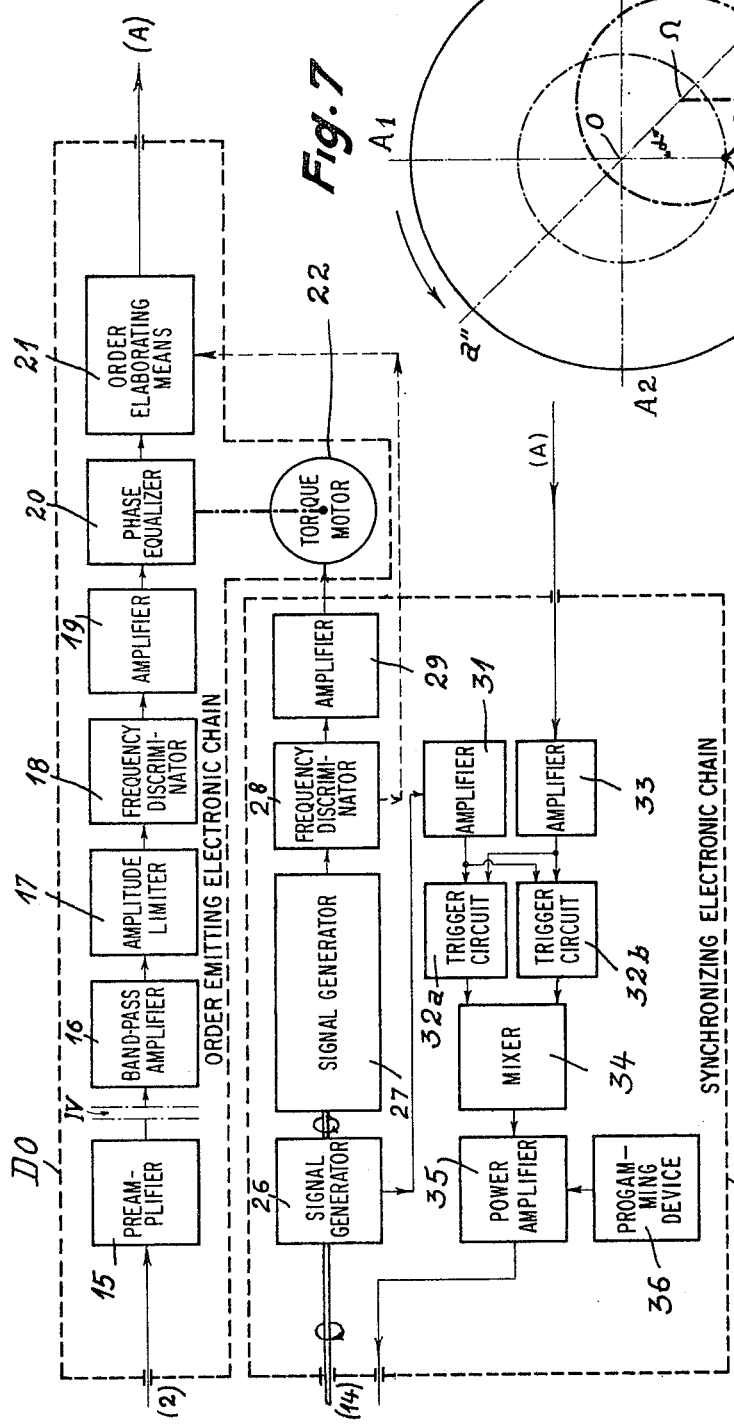
FIG. 5 is a diagram of a phase corrector or equalizer, which is controlled by a torque motor.

The phase equalizer can be a band stop filter of a well-known bridget type as shown in FIG. 5, the tune frequency of which can be modified by producing action on the resistor elements.

A phase equalizer of this type is well-known and does not need to be described in this context.

In FIG. 5, there have been shown at 48 and 49 coupling means which can be of the "cathode follower" type (or of the common emitter type in the case of transistors), etc.

When the autorotational velocity of "rotational frequency" of the missile varies, the tune frequency of the phase equalizer follows in a continuous manner the variation of said velocity.

Figure 8:
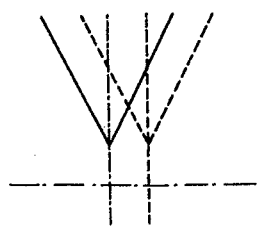
FIG. 8 is a diagram of operation of the phase equalizer.

In fact, when the "driving frequency" varies, the frequency discriminator 28 delivers to the power amplifier 29 an equalizing voltage which results in a rotation of the torque-motor shaft through an angle such that the phase-equalizing circuit is thus retuned to the new frequency. This transposition of tuning of the phase equalizer is shown in FIG. 8.

In the case of a linear system, the method of which is well known in other respects, wherein the order-elaborator 21 is a power amplifier, this latter apparatus is not characterized by any noteworthy feature and its operation will be limited to transmitting to the missile A a sine wave control energy (curve V1 in FIG. 9) which is proportional to the control voltage $V_0$ delivered by the frequency discriminator 18 and amplified by the amplifier 19.

In the case of a nonlinear system, use will be made of the order-elaborator which is illustrated in FIG. 6. In order that the missile should be controlled in dependence on a controlling force (or the like) which is always exerted in the same fixed direction in space, the said order-elaborator generates a square wave which appears once per revolution at the time of a maximum value $\Delta V_0$ of the sinusoidal voltage $V_0$ which is delivered by the frequency discriminator 18, the value $\Delta V_0$ being transformed into a time interval $\Delta T$ (width of square wave) which is directly proportional thereto.

The voltage $\Delta V_0$ which is applied to the two peak detectors 39a and 39b which are followed by the two storage systems 40a and 40b produces two voltages $+\Delta V_0$ and $-\Delta V_0$. There is added to these voltages a voltage $v_0 = kT_0$ ($T_0$ being the period of the sine wave) which is derived from the frequency discriminator 28.

The voltage $v_0$, to which are added respectively $+\Delta V_0$ and $-\Delta V_0$ accordingly provides two resultant voltages $(+\Delta V_0 + v_0;\ -\Delta V_0 + v_0)$ which, when applied to the monostable multivibrators 41a and 41b respectively, give these elements a return time $t1$ and $t2$ respectively.

Figure 9:
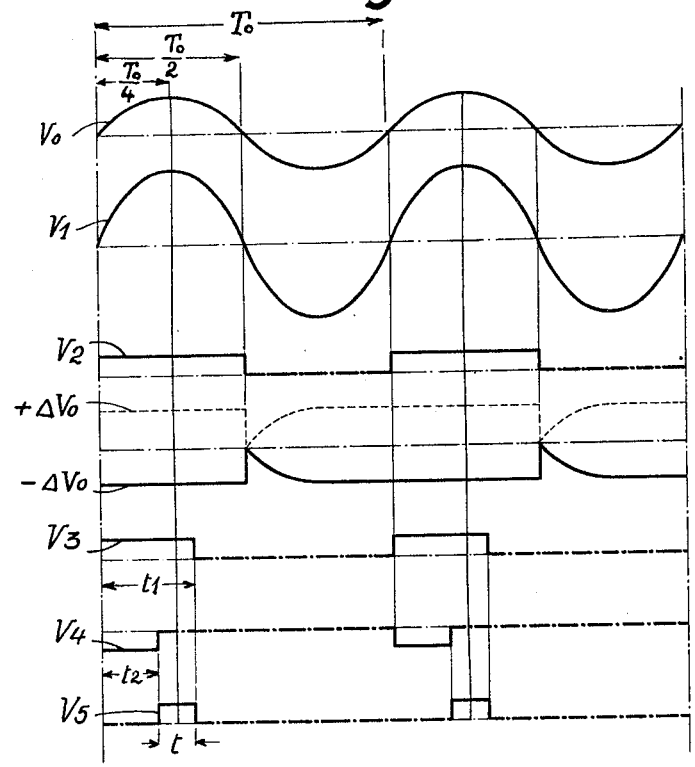
FIG. 9 is a diagram which shows, on the one hand, signals for linear control and, on the other hand, signals for nonlinear control (square-wave signals)

At zero time, the aforesaid monostable multivibrators receive from the trigger circuit 38 a pulse ⊕ (curve V2 in FIG. 9).

The monostable multivibrator 41a effects its return after a time $t_1$ which is proportional to $v_0 + \Delta V_0$ (curve V3); in its turn, the monostable multivibrator 41b effects its return after a time $t_2$ which is proportional to $v_0 - \Delta V_0$ (curve V4).

The sum of the two voltages in the mixer 42 produces a square wave (curve V5 having a width which is proportional to $2\Delta V_0$, this voltage square-wave being applied to the power amplifier 43.

The trigger circuit 38 eliminates the voltages which are stored in the memory or storage system ($+\Delta V_0$ and $-\Delta V_0$) when the pulse ⊕ appears at the time $T_0/2$.

In the description which now follows, there will be indicated by way of example the operation of control means which are mounted on board the missile and which are designed to operate as a linear system.

Figure 10:
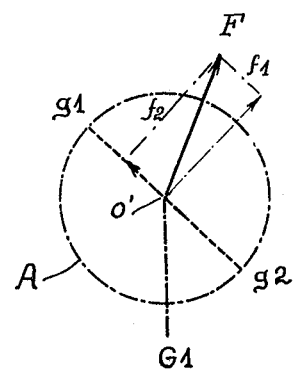
FIG. 10 is a view on a larger scale which represents very diagrammatically the transverse periphery of the autorotative missile and which shows the process involved in guiding the missile (in the case of linear control).

In FIG. 10, in which the missile A is defined by its periphery, it can be visualized that the angular position of the missile (about its autorotational axis) during a rotation can be defined by a certain vector (O'G, for example), which is oppositely directed with respect to the vector (OA) which serves to define the position of the image relative to the stationary modulator or—which amounts to the same thing—the position of the moving modulator during one cycle of its translational motion.

It will now be assumed that, when said vector (O'G) is in the position O'G₁, the missile A emits a synchronizing signal at the moment when the vector (OA) is in the position OA₁. Accordingly, the positions g1 and g2 shown in FIG. 10 will correspond to the position a', a'' which are shown in FIG. 7. As a result of the synchronism, the vector (O'G) always remains in the opposite direction with respect to the vector (OA).

When a force, which is represented by the vector O'F, is applied to the missile at the moment when said missile has rotated about its own axis through an angle $\theta$ (the origin of which has just been defined), said force can be broken down into two components f1 and f2 which are located respectively on the line g1 and g2 and on a line at right angles to said line.

It will accordingly be understood that, if the missile A is designed in such manner as to be responsive to a continuous force during a revolution performed by said missile about its own axis, the resultant of all the unitary forces O'F must be in the direction $g^1$, $g^2$ and in the direction $g^2$ towards $g^1$ in order that the missile should be returned towards the sighting line X—X.

This will in fact be the case if the force O'F which is applied at moment when the missile has rotated about its own axis through the angle $\theta$ has the value:

$$O'F = -A \cos(\theta - \alpha)$$

the above value having precisely the form $(F_v - F_0)$.

The "mean" order must appear at the moment when $O = \alpha$ and the duration of said order must be such that the force which is thereby released has a suitable amplitude to bring the missile back on the line X—X.

In this case also, it is possible to make use of the function $(F_v - F_0)$, since this function satisfies the first condition.

If, according to a method well known in other respects, the missile can only comply with noncontinuous orders, these orders must be sent at the same frequency of recurrence as that which results from the autorotational velocity of the missile.

If the device is, for example, of the type comprising variable thresholds and trigger circuits, the duration of the motion-control order which is transmitted to the missile can be controlled.

In all cases, the means order appears necessarily when $\theta = \alpha$.

It will be apparent from the foregoing that the mere knowledge of the wave $(F_v - F_0)$ permits the possibility (taking account of the fact that the velocity of circular translational motion of the modulator 6 is equal to the autorotational velocity of the missile) of guiding said missile after processing the said wave by means of a suitable electronic device of said missile.

By way of indication, the frequency $F_0$ of the signals produced by periodic occulting (by the modulator 6) of the image of the missile which is projected onto the modulator 6 is, for example, of the order of 300 cycles per second; the width of the pass-band of the preamplifier 15 is of the same order and ranges, for example, from 200 to 500 cycles per second; the pass-band of the amplifier 16 is of the same order. At the output of the frequency discriminator 18, a low-frequency wave appears having the form:

$$-A \cos(\theta = \alpha)$$

said wave is suitable for use in the order-elaborating means 21.

It can readily be appreciated that the device does not call for any detection or filtering of error signals at the analysis frequency, thereby eliminating the introduction of the usual phase lags.

Further advantages of the invention are, on the one hand, its simplicity which is due to the fact that the position of the missile need be defined only in polar coordinates and, on the other hand, the fact that all the constituent elements of the device are well known to those who are versed in the art and who thus have a wide choice of specific means for the operation of the invention, since it is apparent that the example of embodiment of the remote control device as hereinbefore described and as illustrated in the accompanying drawings has been given solely by way of indication and not by way of limitation and that any detail modification can be made while remaining in the frame of the invention, as defined in the appended claims.

In addition, instead of being employed for the remote-command guidance of an autorotative missile, the invention can be applied (whether in conjunction or not with a command guidance operation) for the purpose of effecting other control operations on board an autorotative missile.

What I claim is:
1. In a remote command device for a missile rotating about its longitudinal axis and having a flight direction system and control signal receiving means having its output connected to said system for the actuation thereof, said control signal receiving means not being designed to ensure a linear relation between the control signal which is applied thereto and the force which said control signal receiving means is intended to supply, said command device being constituted by a synchronizing signal emitter mounted on board said missile for generating synchronizing signals each time the missile passes through a reference position about its longitudinal axis, and by a command station having a sighting system provided with an object-lens the optical axis of which forms a reference axis, a light modulator constituted by a plane support disposed to the rear of said object-lens, in the image plane thereof, fitted with an occulting grating formed of alternately transparent and opaque radial sectors and able to carry out a movement of circular translation while remaining parallel to itself in its own plane, a motor operatively connected with said light modulator so as to cause said modulator to describe said movement of circular translation, a stationary photoelectric cell disposed to the rear of said light modulator, said photoelectric cell producing pilot signals the frequency of which is constant as long as the missile is on said reference axis, whereby the image of said missile is located on the axis of circular translation of said light modulator, but which frequency varies periodically about a constant mean value as soon as the missile deviates from said reference axis whereby the image of said missile does not coincide with the axis of circular translation; said command station having an electronic unit comprising (1) an order emitting electronic chain capable of transforming incoming frequency variations into outgoing control signals and having its input and output connected respectively to said photoelectric cell and to the input of said control signal receiving means, said order-emitting electronic chain comprises at least: an amplitude limiter whose input is connected to said photoelectric cell; a frequency discriminator whose input is connected to the output of said amplitude limiter; a retunable phase equalizer whose input is connected to the output of said frequency discriminator and whose output is linked to the missile; and a torque motor operatively connected with said phase equalizer and connected to said synchronizing electronic chain so as to be controlled by said synchronizing electronic chain, said order emitting electronic chain being able to produce, at each revolution of said missile about its longitudinal axis, a square-wave signal which is developed at the time of a maximum value of the alternating current voltage delivered by said frequency discriminator, said order-emitting electronic chain comprising downstream from said phase equalizer, two peak detectors mounted to act in opposite directions and connected in parallel to the output of said phase equalizer; a trigger circuit of the class of a Schmidt trigger connected to the output of said phase equalizer; a storage system connected to each peak detector; a time-controlled monostable multivibrator connected to each storage system and operated in dependence on a reference frequency which is a function of the speed of the motor which is operatively connected with the modulator; a mixer connected to each of the two monostable multivibrators; and a power amplifier which is connected to said mixer, said power amplifier supplying said control signals to said missile, one of the outputs of the trigger circuit being connected in parallel to the two storage systems, while the other output of said trigger circuit is connected in parallel to the two monostable multivibrators, and (2) a synchronizing electronic chain having an input connected to said synchronizing signal emitter of the missile and an output connected to said motor for automatically controlling the speed of circular translation of said modulator, so that the circular translation is automatically synchronized with the rotation of the missile about its longitudinal axis and so that the control signals automatically produced at said command station are automatically sent to said control signal receiving means only when the missile passes through a command position about its longitudinal axis.

2. In a remote command device for a missile rotating about its longitudinal axis and having a flight direction system and control signal receiving means having its output connected to said system for the actuation thereof, said command device being constituted by a synchronizing signal emitter mounted on board said missile for generating synchronizing signals each time the missile passes through a reference position about its longitudinal axis, and by a command station having a sighting system provided with an object-lens the optical axis of which forms a reference axis, a light modulator constituted by a plane support disposed to the rear of said object-lens in the image plane thereof, fitted with an occulting grating formed of alternately transparent and opaque radial sectors and able to carry out a movement of circular translation while remaining parallel to itself in its own plane, a motor operatively connected with said light modulator so as to cause said modulator to describe said movement of circular translation, a stationary photoelectric cell disposed to the rear of said light modulator, said photoelectric cell producing pilot signals the frequency of which is constant as long as the missile is on said reference axis, whereby the image of said missile is located on the axis of circular translation of said light modulator, but which frequency varies periodically about a constant mean value as soon as the missile deviates from said reference axis whereby the image of said missile does not coincide with the axis of circular translation; said command station having an electronic unit comprising (1) an order-emitting electronic chain capable of transforming incoming frequency variations into out-going control signals and having its input and output connected respectively to said photoelectric cell and to the input of said control signal receiving means, said order-emitting electronic chain comprises at least: an amplitude limiter whose input is connected to said photoelectric cell; a frequency discriminator whose input is connected to the output of said amplitude limiter; a retunable phase equalizer whose input is connected to the output of said frequency discriminator and whose output is linked to the missile; and a torque motor operatively connected with said phase equalizer and connected to said synchronizing electronic chain so as to be controlled by said synchronizing electronic chain, and (2) a synchronizing electronic chain having an input connected to said synchronizing signal emitter of the missile and an output connected to said motor for automatically controlling the speed of circular translation of said modulator so that the circular translation is automatically synchronized with the rotation of the missile about its longitudinal axis and so that the control signals automatically produced at said command station are automatically sent to said control signal receiving means only when the missile passes through a command position about its longitudinal axis, said synchronizing electronic chain comprising: two signal generators which are actuated by said motor of the light modulator, one of said generators being able to produce a current whose frequency corresponds to the speed of rotation of said motor, while the other generator is able to produce a current whose frequency is a multiple of the frequency which corresponds to said speed of rotation; two electronic trigger circuits having inputs which are connected respectively to that generator which produces signals whose frequency corresponds to the speed of rotation of said motor and to the synchronizing signal emitter; a mixer which is connected to the outputs of the two trigger circuits; a power amplifier which is connected to the output of said mixer and which supplies current to said motor of the light modulator; a programming device connected to said power amplifier; and a frequency discriminator whose input is connected to the generator which is adapted to produce signals whose frequency is a multiple of the frequency of the signals produced by the first generator, the output of said frequency discriminator being connected to said torque motor of said phase equalizer for the purpose of controlling said torque motor.

References Cited

UNITED STATES PATENTS

| | | | |
|---|---|---|---|
| 2,852,208 | 9/1958 | Schlesman | 244—14 |
| 2,989,640 | 6/1961 | Turck | 244—14 X |

SAMUEL FEINBERG, *Primary Examiner.*

BENJAMIN A. BORCHELT, *Examiner.*

M. F. HUBLER, *Assistant Examiner.*